United States Patent
Moon

(10) Patent No.: US 11,483,831 B2
(45) Date of Patent: Oct. 25, 2022

(54) BASE STATION AND SIGNAL TRANSMISSION CONFIGURATION METHOD, AND SIGNAL MEASUREMENT DEVICE AND METHOD THEREFOR

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

( * ) Notice: Subject to any disclaimer, the term of this patent is extended or adjusted under 35 U.S.C. 154(b) by 0 days.

(21) Appl. No.: 17/264,383

(22) PCT Filed: Jul. 30, 2019

(86) PCT No.: PCT/KR2019/009463
§ 371 (c)(1),
(2) Date: Jan. 29, 2021

(87) PCT Pub. No.: WO2020/027537
PCT Pub. Date: Feb. 6, 2020

(65) Prior Publication Data
US 2021/0282140 A1    Sep. 9, 2021

(30) Foreign Application Priority Data

Jul. 30, 2018  (KR) .................. 10-2018-0088512
Jul. 29, 2019  (KR) .................. 10-2019-0091905

(51) Int. Cl.
H04W 72/04    (2009.01)
H04W 64/00    (2009.01)
H04W 88/08    (2009.01)

(52) U.S. Cl.
CPC ....... *H04W 72/0453* (2013.01); *H04W 64/00* (2013.01); *H04W 88/08* (2013.01)

(58) Field of Classification Search
CPC .. H04W 72/0453; H04W 64/00; H04W 88/08
See application file for complete search history.

(56) References Cited

U.S. PATENT DOCUMENTS

2010/0195566 A1  8/2010  Krishnamurthy et al.
2014/0036747 A1  2/2014  Nory et al.
(Continued)

FOREIGN PATENT DOCUMENTS

EP   3 783 973 A1        2/2021
KR   10-2016-0102448 A   8/2016
(Continued)

OTHER PUBLICATIONS

International Search Report of PCT/KR2019/009463 dated Nov. 12, 2019 [PCT/ISA/210].

*Primary Examiner* — Joshua L Schwartz
(74) *Attorney, Agent, or Firm* — Sughrue Mion, PLLC

(57) ABSTRACT

The present embodiments relate to a method and device for obtaining location information of a terminal by using a wireless communication system. Provided according to an embodiment is a device for acquiring the location information of a terminal, the device comprising at least one downlink signal receiver, at least one uplink signal receiver, and a controller for controlling the downlink signal receiver and uplink signal receiver, wherein the controller configures uplink resource assignment information on the basis of control information received by the downlink signal receiver (Continued)

and determines whether an uplink signal is received, on the basis of the uplink resource allocation information.

20 Claims, 12 Drawing Sheets

(56) References Cited

U.S. PATENT DOCUMENTS

| | | |
|---|---|---|
| 2014/0274073 A1 | 9/2014 | Ramanan et al. |
| 2015/0263818 A1 | 9/2015 | Guo et al. |
| 2016/0205499 A1 | 7/2016 | Davydov et al. |
| 2016/0286353 A1 | 9/2016 | Barlev |
| 2019/0230618 A1* | 7/2019 | Saur ................ G01S 5/0236 |
| 2020/0382190 A1* | 12/2020 | Pawar ............... H04W 72/0453 |

FOREIGN PATENT DOCUMENTS

| | | |
|---|---|---|
| WO | 2015/129985 A1 | 9/2015 |
| WO | 2015/192113 A1 | 12/2015 |
| WO | 2016/068542 A2 | 5/2016 |
| WO | 2018/099568 A1 | 6/2018 |
| WO | 2018/212576 A1 | 11/2018 |

* cited by examiner

BASE STATION AND SIGNAL TRANSMISSION CONFIGURATION METHOD, AND SIGNAL MEASUREMENT DEVICE AND METHOD THEREFOR

TECHNICAL FIELD

The present disclosure relates to methods and base stations for performing a signal transmission configuration, and more specifically, when a terminal is a target terminal whose location is required to be measured, to a method and a base station for determining a control information transmission configuration so that a reception performance of a signal measurement device measuring a location of the target terminal can be improved.

BACKGROUND ART

Recently, for public services, a third party, not a communication service provider, has attempted to acquire a location or movement information of terminals placed in a specific area. As an example, public organizations of the Korea Expressway Corporation and the Korea National Police Agency have attempted to acquire information such as the number or speed of terminals passing through a specific area.

In such a situation, a method of allowing a third party other than a communication service provider to acquire information on a location or traffic of terminals placed in a specific area for the purpose of public service has not been provided yet. In particular, there is a substantial limitation that methods of acquiring such information should be implemented without affecting communication equipment and communication networks which have been already installed. Further, communication service providers are desired to estimate a location of terminals more accurately.

DETAILED DESCRIPTION OF THE INVENTION

Technical Problem

The present disclosure is to improve a performance of receiving downlink control information in providing devices and methods of acquiring downlink control information, determining an uplink signal based on this, and then measuring a location of a terminal.

Technical Solution

In accordance with at least one aspect of the present disclosure, embodiments described herein relate to a device for measuring location information of a terminal, the device comprising one or more downlink signal receivers, one or more uplink signal receivers, and a controller for controlling the one or more downlink signal receivers and the one or more uplink signal receivers, wherein the controller configures uplink resource assignment information based on control information received by the one or more downlink signal receivers and determines whether an uplink signal is received based on the uplink resource allocation information. In order to improve a performance of the device for receiving the downlink control information, a base station transmits the control information using a modulation and coding scheme (MCS) defined in advance.

Further, this predefined MCS information can be shared, in advance, with devices measuring a signal from a target terminal according to at least one aspect of the present disclosure, leading the devices to collect information easily. That is, instead of transmitting a signal considering a channel condition of the target terminal for all or a part of control information to be transmitted to a target terminal whose location is required to be measured, the base station can transmit a signal so that the signal measurement device of the present disclosure can easily receive the signal. This method can also be applied to control information transmitted over a PDSCH, as well as control information transmitted over a PDCCH in a mobile communication system.

Effects of the Invention

In accordance with various embodiments, a performance of a device for receiving downlink control information, which collects the presence or absence of a terminal and location information of the terminal can be improved while not affecting existing communication networks. Further, the complexity of devices of measuring signals from neighboring terminals can be decreased.

BEST MODE FOR CARRYING OUT THE INVENTION

Figure 1:
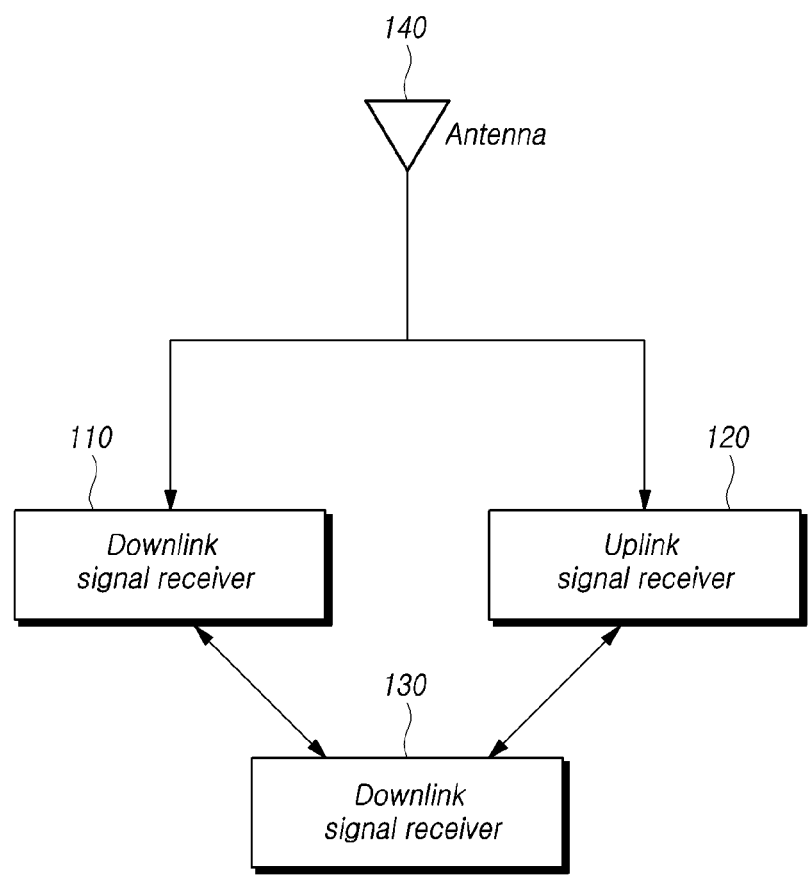
FIG. 1 illustrates a configuration of a signal measurement device according to one aspect of the present disclosure.

Hereinafter, other aspects of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally denote a station communicating with the terminal. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area, and 2) the other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be denoted as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received. A base station can transmit resource assignment information to a terminal through a PDCCH, Further, the base station can transmit a control signal for resource assignment and signal transmission to the terminal through a PDSCH as well.

Any of multiple access techniques applied to wireless communication systems may be applicable to a wireless communication system of the present disclosure. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments or examples described in the present disclosure may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a machine type communication (MTC) terminal may denote a terminal supporting low costs (or low complexity), a terminal supporting coverage enhancement, or the like. As another example, the MTC terminal may denote a terminal defined as a predetermined category for supporting low cost (or low complexity) and/or coverage enhancement.

In other words, the MTC terminal herein may denote a low cost (or low complexity) user equipment category/type newly defined in 3GPP Release-13 and performing LTE-based MTC-related operations. The MTC terminal may denote a user equipment category/type defined in or before 3GPP Release-12, which supports enhanced coverage in comparison with the typical LTE coverage or supports low power consumption. The MTC terminal may also denote a low cost (or low complexity) user equipment category/type newly defined in Release-13. The MTC terminal may denote a further enhanced MTC terminal defined in Release-14.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

A signal measurement device according to embodiments of the present disclosure may be mainly used for measuring a signal from a target terminal, and based on this, measuring a location of the target terminal. A device of performing such a function may be referred to as the signal measurement device, a location measurement device, a position finder, and the like, and thus, these devices may be referred to as devices having substantial equal or similar functionality.

In accordance with one aspect of the present disclosure, methods and apparatuses are provided for acquiring information on a location of a terminal in a wireless communication system, particularly a mobile communication system.

In accordance with one aspect of the present disclosure, a communication device with a new configuration is proposed in which both a downlink signal receiver and an uplink signal receiver are included. This proposed communication device may include one or more uplink signal receivers, and in this case, each uplink signal receiver may be installed in a physical location different from one another.

The communication device can acquire information on one or more signals that may be transmitted from a terminal to a base station through uplink by analyzing a downlink signal transmitted by the base station. Further, the communication device can determine whether data of the uplink are transmitted from the terminal to the base station through one or more uplink receivers, and identify a location of the terminal.

Embodiments or examples of the present disclosure are related to a technology for acquiring location information of terminals in the wireless communication system.

Devices and methods in which embodiments of the present disclosure are applicable may be used for services of providing accurate location information of a terminal using a mobile communication system, as well as services of providing traffic information and public services through the wireless communication system.

Embodiments and examples of the present disclosure are expected to be applied in various fields, such as a service of providing a location of a terminal, road control, traffic control, a location information service, and security.

A related technology that is closely associated with the embodiments or examples of the present disclosure is mobile communication systems.

Hereinafter, embodiments of the present disclosure will be discussed in detail with reference to accompanying drawings. Further, in describing embodiments of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted based on the context of the present disclosure.

Meanwhile, each of embodiments or examples described below may be applicable individually or in any combination with one or more other embodiments or examples.

FIG. 1 illustrates a configuration of a signal measurement device according to one aspect of the present disclosure. The signal measurement device shown in FIG. 1 can receive uplink resource assignment information transmitted through a wireless communication system, determine whether a terminal transmitting a signal on the corresponding resource based on the uplink resource assignment information is present, and acquire information on a location of the terminal based on information related to the signal, such as an intensity of the signal. Discussions on the signal measurement device shown in FIG. 1 are conducted based on a scenario in which uplink resource assignment information is acquired via at least one downlink signal receiver.

Referring to FIG. 1, the signal measurement device according to one aspect of the present disclosure may include a downlink signal receiver 110, an uplink signal receiver 120, and an antenna 140. Thus, the signal measurement device according to one aspect of the present disclosure can receive both an unlike signal and a downlink signal, unlike a normal mobile communication terminal or a base station.

In the structure of FIG. 1, uplink and downlink signals can be received via a single antenna. Further, the signal measurement device can enable a controller 130 to control the uplink signal receiver 120 and the downlink signal receiver 110 to interoperate with each other. However, embodiments of the present disclosure are not limited thereto. For example, in the structure of FIG. 1, when needed, an uplink antenna and a downlink antenna, which are separated from each other. may be employed, and multiple uplink antennas and multiple uplink receivers may be employed.

Figure 2:
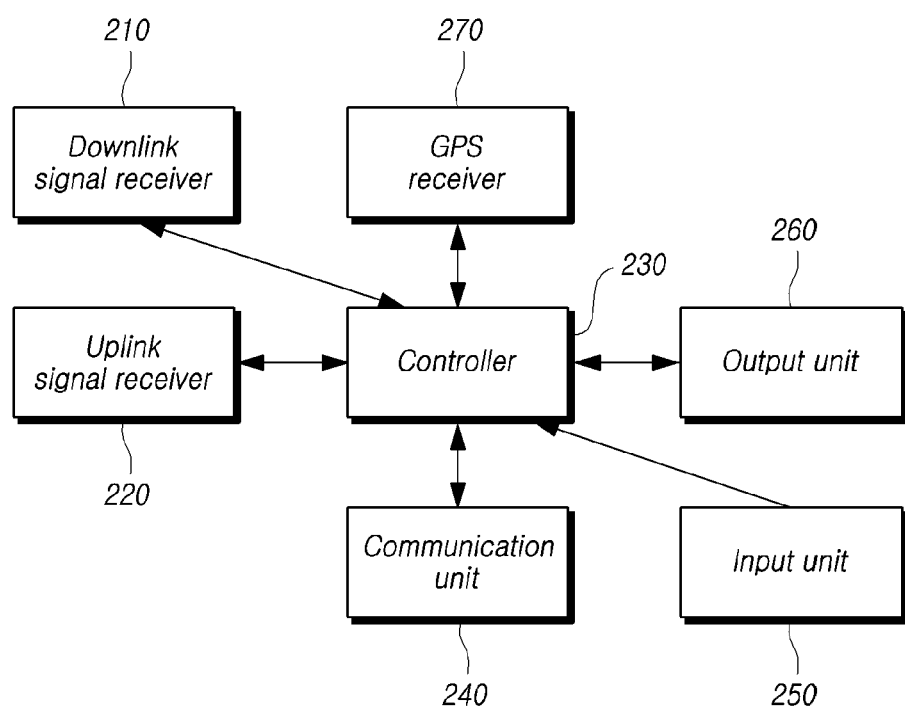
FIG. 2 illustrates a configuration of a signal measurement device according to another aspect of the present disclosure.

FIG. 2 illustrates a configuration of a signal measurement device according to another aspect of the present disclosure.

Referring to FIG. 2, the signal measurement device includes one or more downlink signal receivers 210 and one or more uplink signal receivers 220 to receive a signal in a mobile communication network. Further, the signal measurement device includes a controller 230 for controlling the received signal. Specifically, one or more downlink signal receivers 210 can receive a downlink signal; the controller 230 can acquire control information for a target terminal based on the downlink signal; and one or more uplink signal receivers 220 can receive an uplink signal from the target terminal based on the control information on the target terminal. Further, the controller 230 can determine a location of the target terminal based on the uplink signal received from the target terminal. Optionally, the signal measurement device may include a communication unit 240 for performing communication with a base station, a location measurement server, or one or more other signal measurement devices, a GPS receiver 270 for performing synchronization with an absolute time, an input unit 250 for receiving an input from a user, and an output unit 260, such as a display, outputting information processed by the controller 230.

Here, the downlink signal receiver 210 and the uplink signal receiver 220 may be an LTE downlink signal receiver and an LTE uplink signal receiver, respectively. The operation of one or more signal measurement devices of the present disclose for performing communication is discussed based on the LTE system; however, it should be noted that the devices may be easily applicable to other wireless communication systems, such as 5G, GSM, W-CDMA, and the like. That is, if a communication system in which a call of a target terminal is established is the GSM or W-CDMA system, the downlink signal receiver 210 and the uplink signal receiver 220 are implemented as a downlink signal receiver and an uplink signal receiver of GSM or W-CDMA system, respectively.

The downlink signal receiver 210 serves to acquire time synchronization to the LTE system by capturing a downlink signal from the system in an initial stage, and acquire an ID of an associated base station, system information, and the like. Further, the downlink signal receiver 210 can receive control information transmitted by the base station to a target terminal. The uplink signal receiver 220 serves to detect a transmission signal from a target terminal based on information on an uplink transmission resource assigned to the target terminal, and calculate an arrival time of the signal, signal power, and the like.

The signal measurement device of the present disclosure is required to have a capability of acquiring an absolute time reference, and calculating a difference in time points at which respective signal measurement devices receive an uplink signal from the target terminal. In the embodiment of FIG. 2, to do this, one or more signal measurement devices can acquire time synchronization based on a GPS signal received by the GPS receiver 770. However, embodiments of the present disclosure are not limited thereto. For example, time synchronization may be acquired between different types of signal measurement devices, or any method capable of identifying a difference in time points at which an uplink or downlink signal arrives may be used. For example, time synchronization may be implemented by setting a time in advance between signal measurement devices using a high-precision clock, or by any method or technique capable of calculating a relative difference in time. Further, location measurement may be performed by time information based on a time difference between a time point at which a specific signal is received by the LTE downlink signal receiver and a time point at which an uplink signal from another user is received. Information on such reception times may be transmitted to a location measurement server. The location measurement server can determine a location of a target terminal based on the measurement results of one or more signal measurement devices. The location measurement server of the present disclosure can determine a location of a target terminal based on measurement results for a signal from the target terminal which are performed by one or more signal measurement devices, and to do this, can use various measurement results, such as propagation delay, propagation attenuation, a reception direction of a signal, and the like.

In some embodiments, the signal measurement device of the present disclosure may use the communication unit 240 as a separate communication unit for directly communicating with a location measurement server or a base station, or for directly communicating one or more other signal measurement devices. Since the communication unit 240 is connected to the base station or the location measurement server, the signal measurement device can provide information to, or receive information from, the base station or the location measurement server. Specifically, to perform location measurement for a target terminal, the communication unit 240 can transmit, to a base station, a signal requesting control information for the target terminal.

In one embodiment, the communication unit 240 of the signal measurement device may transmit channel state information of the signal measurement device to the base station. According to this, the base station can transmit control information for the terminal considering the channel state information of the signal measurement device, as well as channel state information of the terminal.

The signal measurement device of FIG. 2 includes an output unit 260 such as a display for providing a location of the target terminal to a user. Further, the location measurement device includes the input unit 250 for receiving an input from a user. It is therefore possible to increase the accuracy of location measurement by allowing the user to manually input additional information such as information on a current position of the location measurement device through the input unit 250. Further, the signal measurement device includes the controller 230 for controlling the operation of the signal measurement device. The controller 230 is connected to associated devices, units, or components, and serve to control information reception, measurement, communication, input and output, and the like needed to perform embodiments of the present disclosure.

Figure 3:
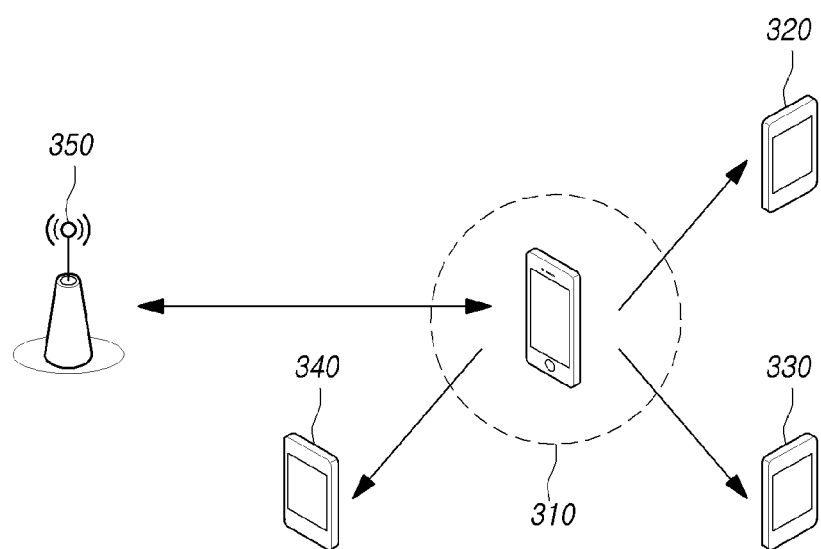
FIG. 3 illustrates a conception of location measurement according to one aspect of the present disclosure.

FIG. 3 illustrates a conception of location measurement according to one aspect of the present disclosure.

Referring to FIG. 3, one or more signal measurement devices may be placed in the vicinity of a target terminal whose location is required to be measured. The signal measurement devices receive a signal transmitted by the target terminal, measure information of an intensity of the received signal, an arrival time delay, and the like, and determine a location of the target terminal based on the measured information. In one method, the determination of the location of the target terminal can be performed such that the signal measurement devices transmit information obtained by measuring the signal transmitted by the target terminal to a location measurement server, and then the location measurement server can calculate a location of the target terminal. Information on the calculated location of the target terminal may be transmitted to each signal measurement device. Further, in another method, the signal measurement devices can share measurement results obtained by measuring the signal transmitted by the target terminal with one another, and then each signal measurement device can measure or determine a location of the target terminal. In the above process, a base station can perform communication with the target terminal by establishing a link with the target terminal, and transmit, to the target terminal, uplink resource assignment information so that the target terminal can transmit an uplink signal. The one or more signal measurement devices may be devices similar to the signal measurement device of FIG. 1 or 2, and it should be noted that configurations and/or discussions related to the signal measurement device of FIG. 1 or 2 may be substantially equally applicable to the signal measurement device of FIG. 3. The embodiment as shown in FIG. 3 may be variously used for measuring a location of a target terminal.

The signal measurement device according to embodiments of the present disclose can measure a signal transmitted by a target terminal, and based on this, acquire information on the presence or absence of the target terminal, location information, a distance from the signal measurement device, and the like. In this process, the signal measurement device can measure information of an intensity of a signal transmitted by the target terminal, a time delay, and the like.

The signal measurement device of FIG. 1 or 2 can acquire uplink resource assignment information by receiving a downlink signal in the mobile communication system. Specifically, the signal measurement device of the present disclosure can determine which control information may be transmitted from a base station to a terminal by receiving a forward signal, i.e. a downlink signal. In particular, by receiving control information connected with a radio network temporary identifier (RNTI) via a downlink signal receiver, the device of the present disclosure can determine whether an uplink signal may be transmitted, that is, whether the terminal may transmit the uplink signal to the base station based on the control information thereafter.

The term "RNTI" is used as a temporary ID of a terminal in a base station, and since information on which RNTI is assigned to a terminal is not provided, its anonymity can be maintained. Herein, the RNTI is employed for the purposed of identifying a terminal; however, embodiments of the present disclosure are not limited thereto. Herein, it should be noted that any ID temporarily assigned to a terminal in one base station or cell may be used for the same purpose or function as the RNTI.

That is, instead of measuring location information for any terminal, the device of the present disclosure can receive control information connected with a specific RNTI for measuring location information of only a terminal identified with the specific RNTI. When the RNTI is used as identification information of a terminal, there is an advantage that can specify a terminal whose location information is required to be measured at a specific time without leaking personal information of a user (e.g. a phone number, a name, a serial number).

In embodiments of the present disclosure, there are provided methods of acquiring information of a terminal including the presence or absence of the terminal, a distance from one or more signal measurement devices, a location of the terminal, and the like based on the RNTI information. In the present disclosure, it is necessary to perform reception and demodulation for a downlink channel in order to receive control information including uplink resource assignment transmitted on downlink. In the present disclosure, methods of receiving downlink control information are discussed.

In one embodiment of the present disclosure, a base station can signal RNTI information of a target terminal to one or more signal measurement devices in advance, and based on this, collect the presence or absence of the target terminal or location information of the target terminal. For example, in the embodiment of FIG. 3, a base station can communicate with a communication unit of a signal measurement device, and provide RNTI information of a target terminal to the signal measurement device. In another embodiment, a mobile communication base station and one or more signal measurement devices of the present disclosure can define, in advance, an RNTI of a terminal to transmit an uplink signal. That is, an RNTI to be used may be defined in advance, and then, the terminal may be allowed to transmit an uplink signal using the predefined RNTI. Further, downlink control information may be transmitted based on the RNTI. However, it should be noted that configurations and discussions of the present disclosure may be substantially equally applicable in even a situation in which a signal measurement device does not know an RNTI of a target terminal or desires to acquire location information on unspecified terminals.

In the present disclosure, a base station or a mobile communication system can establish a communication line with a target terminal so that the target terminal can transmit an uplink signal. To do this, the base station may transmit uplink resource assignment information through downlink to the target terminal periodically or aperiodically.

In this process, the signal measurement device of the present disclosure can receive the resource assignment information transmitted by the base station to the target terminal, and based on this, measure a signal transmitted by the target terminal. That is, the signal measurement device of the present disclosure can acquire uplink resource assignment information by receiving downlink of an associated mobile communication system. Here, the resource assignment information received by the signal measurement device is resource assignment information for any terminal, that is, information transmitted to the terminal. Since such resource assignment information is transmitted using a modulation and coding scheme and power optimized for a target terminal, there is therefore a probability that the signal measurement device may not properly receive the resource assignment information. That is, the resource assignment information is transmitted to the target terminal, and therefore, the signal measurement device of the present disclosure may not be guaranteed to properly receive the resource assignment information transmitted to the target terminal. In case the signal measurement device does not properly receive the resource assignment information, the signal measurement device may not normally operate. In the present disclosure, taking account of such a situation, there is provided a method for accurately identifying the presence or absence, or a location, of a target terminal by improving a downlink reception performance of the signal measurement device. In the present disclosure, to improve a performance of a signal measurement device for receiving control information transmitted to a target terminal, there is provided a method of allowing a base station to transmit control information using a format defined in advance between the base station and one or more signal measurement devices of the present disclosure. In case of a normal communication, such a format may be defined in advance, for example, through an agreement or arrangement, between a base station and a target terminal having an established communication link with the base station. However, in the present disclosure, to improve a reception performance of the signal measurement device of the present disclosure, not a reception performance of a target terminal, there is proposed a method of transmitting resource assignment information using a format defined in advance between a base station and the device of the present disclosure.

Figure 4:
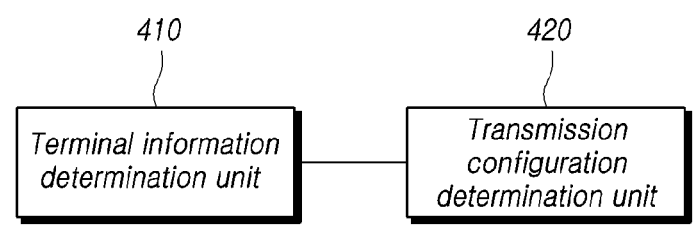
FIG. 4 illustrates a configuration of a base station according to one aspect of the present disclosure.

FIG. 4 is a block diagram illustrating a configuration of a base station according to one aspect of the present disclosure.

Referring to FIG. 4, the base station of the present disclosure includes a terminal information determination unit 410 determining whether a terminal is a target terminal whose location is required to be measured, and a transmission configuration determination unit 420 determining a configuration for transmitting control information for the terminal based on a result of the determination.

Specifically, the terminal information determination unit 410 of the base station of the present disclosure can determine whether a terminal is a target terminal whose location is required to be measured, or a normal terminal whose location is not required to be measured.

In one embodiment, the terminal information determination unit 410 can determine whether a terminal is a target terminal whose location is required to be measured, or a normal terminal whose location is not required to be measured based on a request signal received from a signal measurement device measuring a location of the terminal.

In another embodiment, when a request signal is received from a terminal, the terminal information determination unit 410 can determine that the terminal is a terminal whose location is required to be measured. That is, to allow a location of the terminal to be measured accurately, the terminal itself may be a target terminal by requesting an associated mobile communication system to measure its own location accurately.

In another embodiment, the terminal information determination unit 410 can determine whether a terminal is a target terminal whose location is required to be measured, or a normal terminal whose location is not required to be measured based on a request signal received from an external server. For example, the external server may be a server for an emergency rescue.

Further, the transmission configuration determination unit 420 of the base station of the present disclosure can determine a configuration for transmitting control information for a terminal based on a result of the determination of the terminal information determination unit 410. When the terminal is a terminal whose location is required to be measured, a base station can determine a configuration for transmitting control information for the terminal considering a state of a signal measurement device measuring a location of the terminal, such as a location, a channel state, and the like, as well as a state of the terminal. In contrast, when the terminal is a normal terminal whose location is not required to be measured, the base station can determine to transmit control information for the terminal considering only a state of the terminal.

Specifically, when the terminal is determined as a target terminal, the transmission configuration determination unit 420 can determine at least one of a control channel element (CCE) aggregation level for transmitting control information for the terminal, a modulation and coding scheme (MCS), the amount of resources, the number of bits of transmission data, the minimum number of times that HARQ transmission is required to be performed, transmission power, and a scrambling configuration for a PDCCH.

In one embodiment, when the terminal is determined as a target terminal, the transmission configuration determination unit 420 can determine a CCE aggregation level based on a CCE aggregation level considering a minimum CCE aggregation level and a channel state of the terminal.

In the case of the LTE system, information related to resource assignment may be transmitted through a PDCCH of downlink. The PDCCH may be transmitted by being configured with any of CCE aggregation levels 1, 2, 4, and 8 according to a state of a terminal. When the PDCCH is transmitted by being configured with a high CCE aggregation level, the PDCCH may be easily received even when a channel state is not good, but in this case, a lot of resources and transmission power are required. On the other hand, when the PDCCH is transmitted by being configured with a low CCE aggregation level, which corresponds to a situation where a terminal is placed in the vicinity of a base station, while a signal can be transmitted using a small resource, it is not easy to receive the signal when a channel state is poor.

Such a change of the CCE aggregation level is determined considering a channel state of a target terminal according to embodiments of the present disclosure. In the present disclosure, there is proposed a method of determining a corresponding CCE aggregation level considering a reception performance of an information reception device, such as a signal measurement device, according to embodiments of the present disclosure.

To do this, various configuration methods may be available. In one example, when it is not easy to identify accurately where a signal measurement device of the present disclosure is placed, or when the device of the present disclosure has great mobility, a PDCCH can be transmitted by being configured with a highest CCE aggregation level. In another example, a minimum CCE aggregation level may be determined. Further, minimum transmission power needed to transmit a PDCCH may be determined in advance.

That is, when a base station transmits a PDCCH to a target terminal whose location is required to be measured, the base station can transmit the PDCCH using a modified CCE aggregation level, instead of using a CCE aggregation level required to be used considering a channel state of the target terminal in a normal situation. The modified CCE aggregation level may be determined as follows.

A modified CCE aggregation level=max (a minimum CCE aggregation level, a CCE aggregation level considering a channel state of a target terminal)

Figure 5:
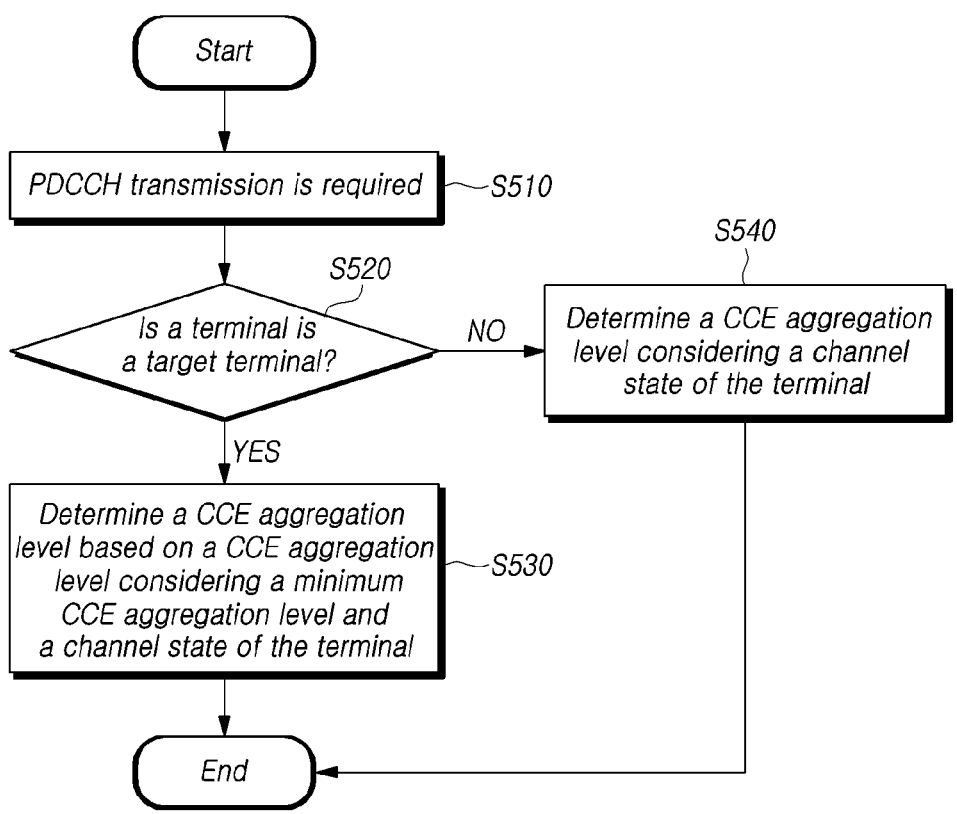
FIG. 5 is a flow chart to show a determination of a configuration for transmitting control information for a terminal according to one aspect of the present disclosure.

FIG. 5 is a flow chart to describe the operation of a base station configuring a CCE aggregation level for a PDCCH.

At an initial stage, the base station determines that a PDCCH transmission is required, at step S510. Thereafter, the base station determines whether a terminal to which the PDCCH is transmitted is a target terminal, at step S520. Here, the base station may receive a request signal from the terminal, a signal measurement device measuring a location of the terminal, or an external server, and based on the received request signal, determine whether the terminal is the target terminal whose location is required to be measured. When it is determined that the terminal is the target terminal whose location is required to be measured, the base station can determine a CCE aggregation level based on a CCE aggregation level considering a minimum CCE aggregation level and a channel state of the terminal, at step S530. In one embodiment, the determined CCE aggregation level may be a max (a minimum CCE aggregation level, a CCE aggregation level considering a channel state of the target terminal). On the other hand, when it is determined that the terminal is a normal terminal whose location is not required to be measured, the base station can determine a CCE aggregation level considering a channel state of the terminal.

Such a determination of the CCE aggregation level may be performed by being defined in advance between the base station and one or more signal measurement devices of the present disclosure. In this case, the device of the present disclosure does not need to search a PDCCH transmitted by being configured with a level less than or equal to the minimum CCE aggregation level; thus, the complexity of the device may be reduced. That is, PDCCH search may be performed for a limited search space.

In another embodiment, when it is determined that the terminal is the target terminal, the transmission configuration determination unit 420 can determine to transmit control information for the terminal using transmission power greater than first transmission power. Here, the first transmission power indicates an amount of transmission power that the signal can reach a location of the terminal, and the transmission of the control information for the terminal by the transmission configuration determination unit 420 using the transmission power greater than the first transmission power denotes that the control information is transmitted using an amount of power enabling an information collection device, such as a signal measurement device, located farther than the terminal to receive a signal. For example, the base station can transmit a signal using maximum transmission power enabling a signal to reach a farthest location of the coverage of the base station.

The transmission or reception power of the PDCCH may be configured to be similar to that of such reception or transmission. Through such a configuration, one or more signal measurement devices according to embodiments of the present disclosure, as well as a target terminal, can stably receive the PDCCH transmitted by the base station to the target terminal.

In a communication system including one or more base stations, one or more target terminals whose locations are required to be measured and whose presence or absence is required to be determined, one or more signal measurement devices detecting a signal transmitted by the target terminal, a method of transmitting control information according to embodiments of the present disclosure, in which the base station transmits control information to the target terminal, may be performed such that the base station determines a format and power of a signal to be transmitted considering a channel state from the base station to the signal measurement device, as well as a channel state from the base station to the target terminal, and then, transmits the control information based on this determination.

In another embodiment, when it is determined that the terminal is the target terminal, the transmission configuration determination unit 420 can configure scrambling for the PDCCH not to use identifier information of the terminal.

In the 5G NR, scrambling for a PDCCH may be different from that of the LTE. In the LTE, scrambling for a PDCCH is performed using information of a cell ID. In the 5G NR, scrambling for the PDCCH may be performed using RNTI information and an nID that is a parameter of an additional higher layer.

The transmission configuration determination unit 420 of the base station of the present disclosure can configure a function of scrambling using RNTI information not to be used in the base station so that the signal measurement device can easily receive a forward PDCCH.

Further, the nID may be configured to be equal to, or in the same manner as, information of a cell ID. The base station can provide information on this configuration to the signal measurement device of the present disclosure. In another method, the base station can define information on a scrambling method including the nID, and then provide this to the signal measurement device. In another method, this information may be defined in advance, and the base station and the signal measurement device can operate with the same information.

In another embodiment, when it is determined that the terminal is the target terminal, the transmission configuration determination unit 420 can determine to transmit a higher layer parameter used for scrambling for the PDCCH and identifier information of the terminal to the signal measurement device. That is, the base station performs scrambling using the function of using RNTI information and using nID information, and provides related information to the device of the present disclosure in advance. In another embodiment, this information may be defined in advance, for example, through an agreement, between the base station and the signal measurement device of the present disclosure. The signal measurement device according to embodiments of the present disclosure performs a reception for the PDCCH based on scrambling information on the PDCCH.

In LTE system, uplink resource assignment information may be transmitted over the PDSCH, as well as the PDCCH. In this case, downlink resource assignment information may be transmitted over the PDCCH, and thereafter, uplink resource assignment information and information on a transmission period, and the like may be transmitted over the PDSCH. Generally, the control for uplink transmission performed through the PDSCH may be, for example, a configuration for the PUCCH, periodic signal transmission through the uplink, semi-persistent scheduling.

When the base station transmits uplink resource assignment for a target terminal over the PDSCH, since the signal measurement device of the present disclosure cannot identify the resource assignment, for example, which type of the resource assignment is transmitted, there is a problem that the signal measurement device is required to attempt to receive all PDSCHs transmitted to the target terminal. This may cause the complexity of the signal measurement device of the present disclosure to increase. In the present disclosure, when a base station transmits a PDSCH for uplink resource assignment to a target terminal, a data transmission scheme, such as an available modulation and coding scheme (MCS), the amount of resources, the number of bits of transmission information, a transmission scheme, and the like may be defined in advance. For example, the PDSCH may be transmitted using an IMCS, which is an MCS index, less than or equal to a predetermined number. In one embodiment, an MCS index for transmitting the PDSCH may be limited to between 1 and 5. In another embodiment, an MCS index for transmitting the PDSCH may be limited to only 0 or 1. In further another embodiment, an MCS index for transmitting the PDSCH may be limited to only 0. Further, when one block is transmitted, the number of bits of control information related to uplink resource assignment allowed to be transmitted may be limited within a predetermined number of bits. Further, when control information is transmitted, the control information may be defined to be transmitted in only a transmission antenna diversity mode.

As discussed above, when a PDSCH transmission is not a predefined PDSCH data transmission type, the device of the present disclosure may not perform corresponding PDSCH reception. Thus, the demodulation and decoding of useless PDSCH data may be minimized.

Even when a PDSCH is transmitted using a low MCS index, there is a probability that any of signal measurement devices of the present disclosure may not successfully receive this PDSCH. This is because the PDSCH is repeatedly transmitted through a HARQ process, in case a target terminal successfully receives it, particularly at an early time, and informs a base station of this, the base station does not perform an additional repetition transmission any more. In the present disclosure, in order to improve a probability that a signal measurement device successfully receives PDSCH information transmitted to a target terminal, even when the target terminal successfully has decoded this, the base station can additionally perform the HARQ. That is, the minimum number of times that HARQ transmission is required to be performed may be defined in advance, and in this case, even when the target terminal transmits an ACK, the base station continually performs the HARQ operation until the minimum number of times is reached.

For example, in the LTE system, the HARQ transmission that can be performed may be limited up to 4 times. When the target terminal successfully receives corresponding data before the HARQ transmission reaches the 4 times, the target terminal can signal that the data have been successfully received by transmitting an ACK to the base station. The base station received the ACK can stop the HARQ transmission of the data.

Figure 6:
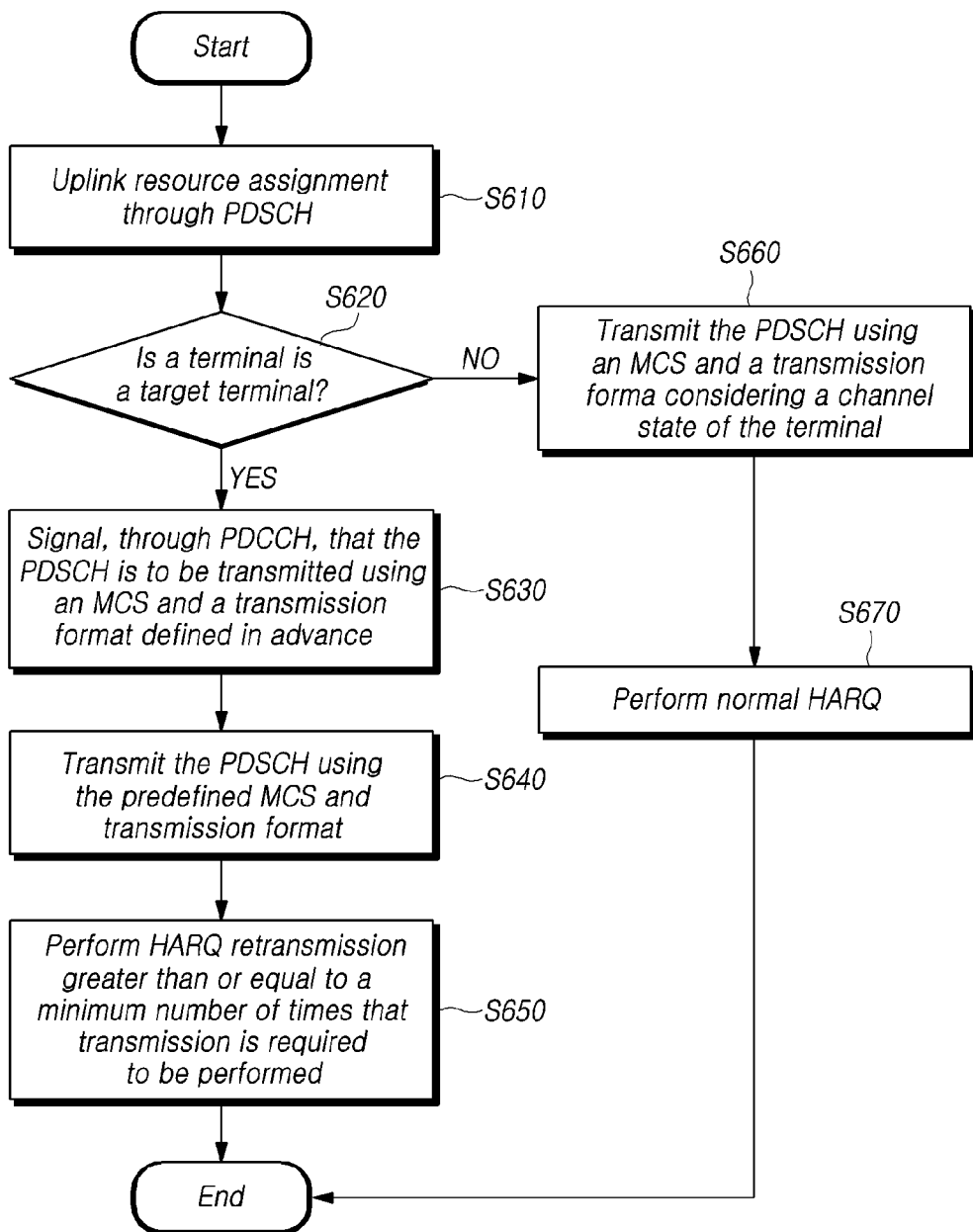
FIG. 6 is a flow chart to show a determination of a configuration for transmitting control information for a terminal according to another aspect of the present disclosure.

FIG. 6 is a flow chart to show operation of a base station for transmitting control information for resource assignment to a target terminal through a PDSCH according to one aspect of the present disclosure.

In the present disclosure, a signal measurement device, as well as a target terminal, may be required to receive the data. That is, even when the target terminal successfully receives the data, there is a probability that the signal measurement device according to embodiments of the present disclosure may not receive the data. In the present disclosure, in order to enable the signal measurement device as well as a target terminal to receive the data, even when the target terminal transmits an ACK, there is provided a method of performing HARQ transmission greater than or equal to a predetermined number of times by ignoring the ACK from the target terminal.

At an initial stage, the base station determines to perform uplink resource assignment to a target terminal through a PDSCH, at step S610. Thereafter, the base station determines whether a terminal to which the PDSCH is transmitted is the target terminal, at step S620. Here, the base station can receive a request signal from the terminal, a signal measurement device measuring a location of the terminal, or an external server, and based on the received request signal, determine whether the terminal is the target terminal whose location is required to be measured.

When it is determined that the terminal is the target terminal, the base station can signal, through a PDCCH, that the PDSCH is transmitted using an MCS and a transmission format defined in advance, at step S630. Further, the base station can perform the PDSCH transmission using the predefined MCS and transmission format, at step S640. The base station can perform HARQ retransmission greater than or equal to a minimum number of times that transmission is required to be performed, at step S650.

For example, in the LTE system, HARQ transmission may be performed up to 4 times, which is the maximum number of times that the HARQ transmission can be performed regardless of an ACK/NACK transmission from a target terminal. This number of times may be provided in advance to the signal measurement device according to embodiments of the present disclosure. Further, the HARQ transmission can be performed through a pre-configured resource, and thus, even when at least a part of the PDCCH is not received, the HARQ of the corresponding PDSCH can be received.

According to embodiments of the present disclosure, when the base station transmits a PDSCH channel, which is a data channel, the base station can determine whether a terminal to which the PDSCH channel is to be transmitted is a normal terminal or a target terminal whose location is required to be measured, and when it is determined that the terminal is the target terminal, transmit the PDSCH channel using a transmission format (including MCS and scrambling), a scheme, power, and the like different from those transmitted for the normal terminal. Accordingly, the signal measurement device of the present disclosure can more stably receive the information of this channel.

According to embodiments of the present disclosure, the base station can provide RNTI information used by the target terminal to the signal measurement device in advance. At the same time, the base station can provide information on the transmission schemes of control channel and data channel transmitted in forward link to the signal measurement device. This may include CCE aggregation level information on the PDCCH of the LTE system. Further, when control information is transmitted over the PDSCH, the information may include information on a transmission format including MCS information used in the PDSCH. Further, when HARQ operation for the PDSCH is performed, information on the number of times that the HARQ transmission is required to be minimally performed may be provided to the signal measurement device according to embodiments of the present disclosure. Further, without providing such information to the signal measurement device, the information may be defined in advance between the base station and the signal measurement device, and thereafter, a signal may be transmitted or received using this information.

On the other hand, when it is determined that the terminal is a normal terminal whose location is not required to be measured, the base station can perform corresponding PDSCH transmission using a MCS and a transmission format considering a channel state of the terminal. At this time, the base station performs normal HARQ transmission, at step S670.

In one embodiment, the base station may further include a communication unit communicating with one or more signal measurement devices measuring a location of a terminal. The communication unit can receive channel state information of the signal measurement device from the signal measurement device, and the transmission configuration determination unit can determine a configuration for transmitting control information for the terminal based on a result of the determination of the terminal information determination unit and the channel state information of the signal measurement device. Specifically, the signal measurement device of the present disclosure may periodically, or aperiodically, provide a state of a forward channel to a mobile communication system or a base station. Further, based on this, the base station may change information on transmission schemes of the control channel and the data channel, and additionally provide this to the signal measurement device of the present disclosure. Like this, information on a scheme for transmitting control information to a target terminal may be changed depending on a channel state of the signal measurement device.

In one embodiment, the base station may further include a communication unit communicating with one or more signal measurement devices measuring a location of a terminal. Specifically, the communication unit may transmit, to the signal measurement device, at least one of a CCE aggregation level, an MCS, the amount of resources, the number of bites of transmission data, the minimum number of times that HARQ transmission is required to be performed, transmission power, and a scrambling configuration for a PDCCH.

Further, in a communication system including one or more base stations, one or more target terminals whose locations are required to be measured and whose presence or absence is required to be determined, one or more signal measurement devices detecting a signal transmitted by the target terminal according to embodiments of the present disclosure, the signal measurement device can define information on a transmission format for transmitting control information to the target terminal in advance with the base station, and thereafter, considering the predefined transmission format, receive control information transmitted to the target terminal on downlink.

Specifically, the base station can share at least one of a CCE aggregation level, an MCS, the amount of resources, the number of bites of transmission data, the minimum number of times that HARQ transmission is required to be performed, transmission power, and a scrambling configuration for a PDCCH in advance with the signal measurement device. That is, information on transmission schemes of the control channel and the data channel may be defined in advance between the base station and the signal measurement device of the present disclosure, and the predefined transmission schemes may be operated without providing this through a specific communication.

Based on this information, the signal measurement device of the present disclosure can receive control information transmitted to a target terminal on downlink of an associated mobile communication system. When the control information is transmitted over the PDCCH, the signal measurement device may search only a search space satisfying a condition of a pre-inputted CCE aggregation level among search spaces of the PDCCH. Further, even when all search spaces are searched, one or more search spaces that have a level different from a predefined CCE aggregation level may be determined not to be a normal PDCCH, and thus ignored.

Further, when control information is transmitted over a PDSCH of an associated mobile communication system, downlink resource assignment information may be transmitted over a PDCCH first. When the PDCCH is received, the signal measurement device can check whether a transmission format of the PDSCH transmitted thereafter is equal to information inputted in advance, and when it satisfies a condition of the pre-inputted information, perform the demodulation and decoding of the PDSCH. Further, in even a reception process of the PDSCH, considering information on HARQ repetition times inputted in advance, an HARQ combination of a signal to be transmitted can be performed.

Based on this, the signal measurement device can acquire information on when an uplink signal may be transmitted and which resource the uplink signal may be transmitted over. The signal measurement device can attempt to receive an uplink signal transmitted by a terminal to a base station based on uplink resource assignment information acquired through such operation, and determine whether the uplink signal is transmitted based on a result obtained by attempting to receive the uplink signal. In this case, this determination may be performed by a controller of the signal measurement device.

When the base station of the present disclosure is used, the complexity of the signal measurement device receiving control information can be reduced, and a performance of the signal measurement device for receiving the control information transmitted to a target terminal can be improved.

If for a time period at which, or a frequency resource on which, it is indicated that an uplink signal is to be transmitted in control information, the transmission of data for the uplink signal from a terminal to a base station is detected through an uplink signal receiver of the signal measurement device, the signal measurement device may determine that the terminal whose location is required to be measured is placed at a location in the vicinity of the uplink signal receiver. Further, based on this, the signal measurement device can acquire information on the terminal including the presence or absence of the terminal, a location of the terminal, and the mobility of the terminal.

Figure 7:
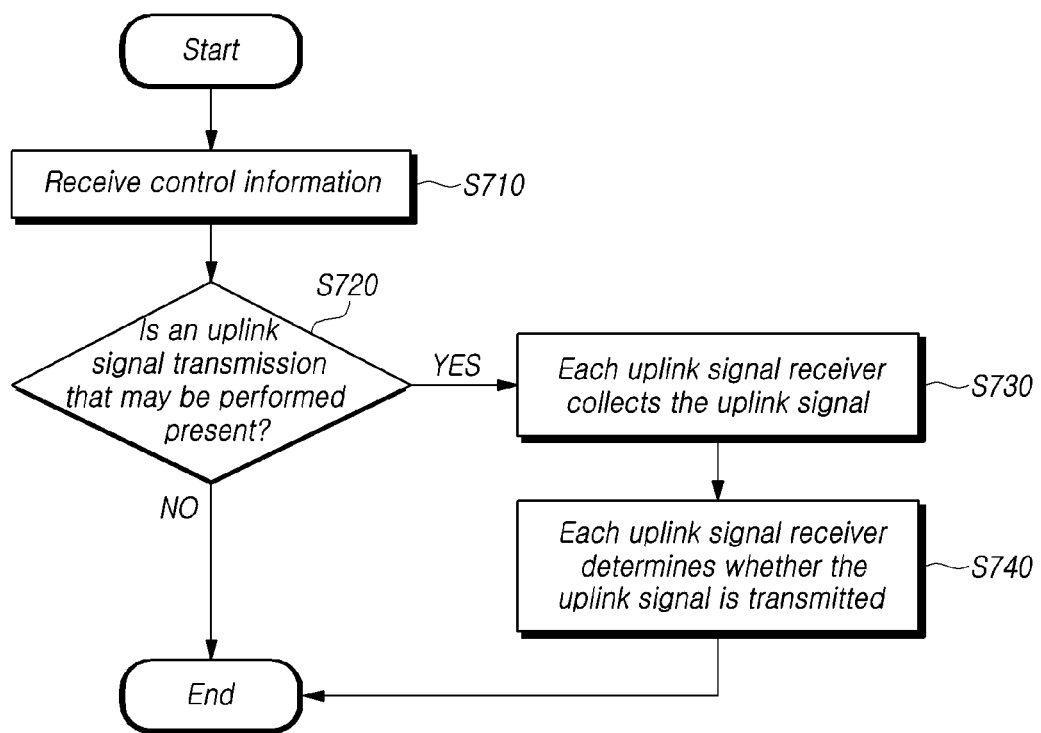
FIG. 7 is a flow chart to show an operation procedure of a signal measurement device according to one aspect of the present disclosure.

FIG. 7 is a flow chart to show an operation procedure of a signal measurement device according to one aspect of the present disclosure.

In FIG. 7, the operation of the device is discussed based on the LTE system as one example of mobile communication systems. The LTE system operates based on a TTI of 1 ms, and forward control information may be transmitted from a base station to a terminal in each transmission time interval (TTI). Meanwhile, the procedure discussed below may be equally applicable to even any mobile communication systems other than the LTE system.

The signal measurement device can receive control information transmitted from a base station to a terminal, at step S710.

The terminal can demodulate and decode one or more downlink signals in each TTI. At this time, the downlink signal received by the terminal from the base station may be a control channel such as a PDCCH or a data channel such as a PDSCH. That is, in the LTE, control information may be normally transmitted through the PDCCH, and when the control information is transmitted through the PDSCH, the PDSCH may be received. In this case, the signal measurement device of the present disclosure may receive the PDCCH of downlink first, and thereafter, attempt to receive the PDSCH on which control information is transmitted.

The signal measurement device of the present disclosure can receive a forward signal transmitted from the base station to the terminal, that is, a downlink signal, and thereafter, identify when an uplink may be transmitted and which resource the uplink may be transmitted over, and which RNTI the terminal has at that time.

Each uplink signal receiver can check whether an uplink signal that may be transmitted is present for the uplink resource identified through this process, at step S720. This process may include to determine whether a terminal that may transmit uplink is present, and which RNTI the terminal has, through control information transmitted on downlink. That is, when each uplink signal receiver determines that an uplink signal transmission may be performed, each uplink signal receiver can collect the uplink signal transmitted to a base station through the corresponding uplink resource, and based on the collected uplink signal, determine whether the uplink signal is transmitted.

When it is determined that an uplink signal transmission may be performed, at step S720-Y, each of one or more uplink signal receivers included in the signal measurement device can attempt to receive the uplink signal for collecting the uplink signal, at step S730.

Further, each uplink signal receiver included in the signal measurement device can determine whether the uplink signal is transmitted, at step S740.

On the other hand, when it is determined that an uplink signal transmission may not be performed, at step S720-N, the device waits until next control information is received without performing a separate uplink signal collecting operation.

This operation may be performed continuously in each TTI. Further, the signal measurement device can identify the presence or absence of a terminal, a location of the terminal, and mobility information thereof based on the presence or absence of the uplink signal transmission, which is determined based on the signal collected by each uplink signal receiver.

The above process may be performed based on information on an RNTI of a terminal. That is, the signal measurement device can determine whether an uplink signal transmitted only from a terminal having a specific RNTI is transmitted, and identify the presence or absence of the terminal having the specific RNTI, a location of the terminal, and mobility information of the terminal.

Figure 8:
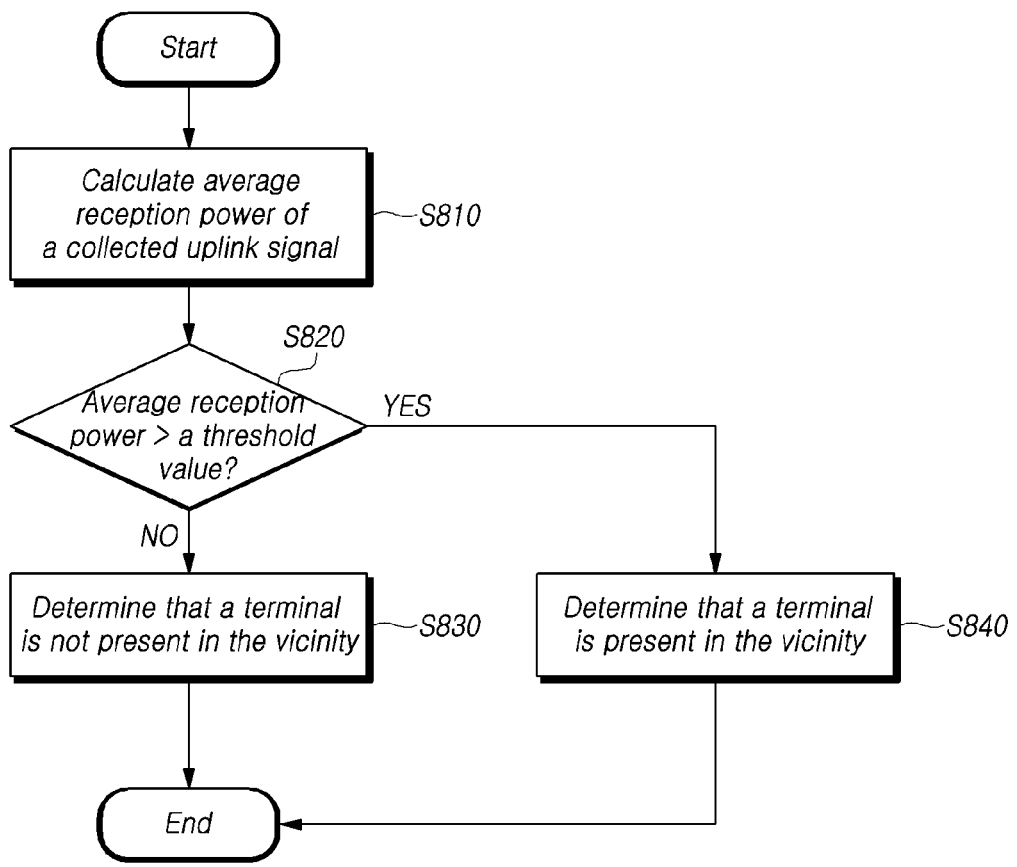
FIG. 8 is a flow chart to show a procedure of detecting the presence or absence of an uplink signal by a signal measurement device according to one aspect of the present disclosure.

FIG. 8 is a flow chart to show a method of detecting the presence or absence of an uplink signal according to one aspect of the present disclosure.

Referring to FIG. 8, a signal measurement device can acquire transmission information of uplink from a reception signal of downlink acquired through a downlink signal receiver. Thereafter, based on the acquired uplink transmission information, the signal measurement device can collect an uplink signal transmitted from a terminal to a base station through a resource assigned on uplink, and calculate average reception power of the collected signal, at step S810.

The signal measurement device can compare a calculated average reception power value with a threshold value calculated or set in advance, at step S820. When the average reception power value is greater than the threshold value through the comparing, at step S820-Y, since the uplink signal has been received, it can be determined that a terminal whose location is required to be measured is placed in the vicinity of the device, at step S840. On the other hand, when the average reception power value is smaller than the threshold value, at step S820-N, since the uplink signal is not received, it can be determined that a terminal whose location is required to be measured is not placed in the vicinity of the device, at step S830.

In the above process, power of a reference signal, which is a pilot signal, transmitted over an uplink PUCCH or PUSCH may be used for calculating a reception power value of uplink. In another method, power of a data signal transmitted over the uplink PUCCH or PUSCH may be used for calculating a reception power value of the uplink. Further, the presence or absence of a terminal and the location information of the terminal can be identified by combining power values of the reference signal and the data signal. Further, such information may be determined using reception power of an uplink SRS transmitted by a target terminal.

Figure 9:
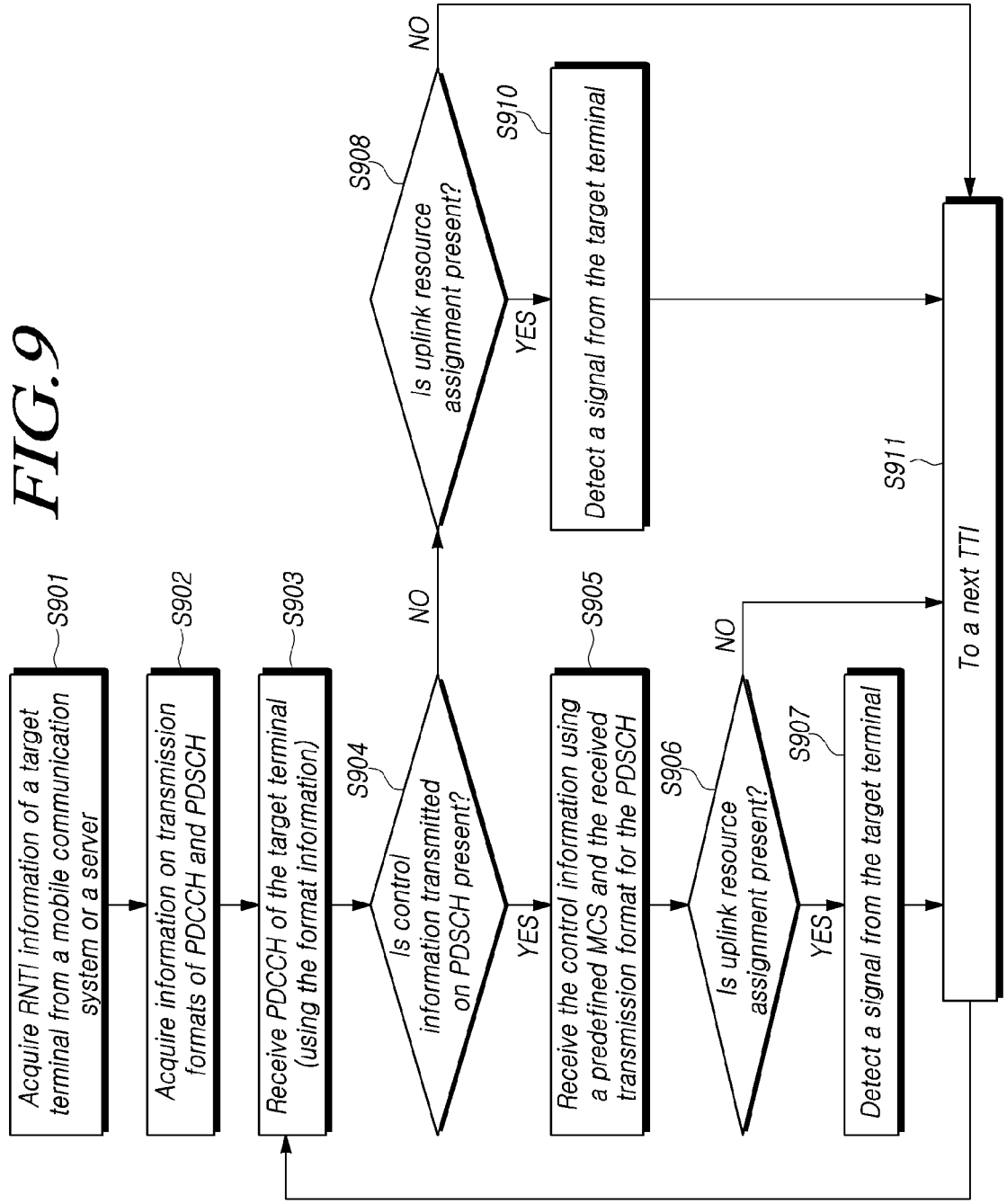
FIG. 9 is a flow chart to show operation of a terminal according to one aspect of the present disclosure.

FIG. 9 is a flow chart to show an embodiment in which a signal measurement device of the present disclosure detects a signal of a target terminal. Referring to FIG. 9, the signal measurement device of the present disclosure can receive RNTI information of a target terminal from a mobile communication system, a base station, or a server, at step S901. Further, the signal measurement device can acquire information on transmission formats of a PDCCH or/and a PDSCH on which control information for the target terminal is transmitted, at step S902. The embodiment of FIG. 9 shows that the information on the transmission format is received from the mobile communication system; however, embodiments of the present disclosure are not limited thereto. For example, the above process may be performed using information defined in advance between the base station of the mobile communication system and the signal measurement device of the present disclosure. The signal measurement device of the present disclosure can measure the presence or absence of a target terminal, a distance therefrom, and location information by receiving a downlink signal and an uplink signal in each TTI. The signal measurement device can receive the corresponding PDCCH based on the transmission format information received in advance, at step S903. The signal measurement device can determine whether control information to be transmitted on the PDSCH is present, at step S904. When it is determined that control information to be transmitted on the PDSCH is not present, the signal measurement device can determine whether uplink resource assignment is present, at step S908. When it is determined that the uplink resource assignment is present, the signal measurement device can attempt to detect a signal from a target terminal corresponding to this, at step S910. When it is determined that control information to be transmitted on the PDSCH is present, the signal measurement device can receive the control information using the transmission format information of the PDCCH and the PDSCH received in advance, at step S905. Further, the signal measurement device can determine whether uplink resource assignment is present, at step S906. When the uplink resource assignment is present, the signal measurement device can attempt to detect a signal from the target terminal for this, at step S907.

The signal measurement device of the present disclosure is a device including a downlink signal receiver and one or more uplink signal receivers. The signal measurement device can acquire uplink resource assignment information by receiving control information via the downlink signal receiver, determine whether an uplink signal transmitted by a terminal to a base station is present based on the acquired information, and determine the presence or absence of the terminal and location information.

Based on this, the signal measurement device can acquire the presence or absence of a terminal whose location is required to be measured, a location of the terminal, mobility information thereof, and the like. Further, this process may be performed without affecting existing communication networks at all.

Figure 10:
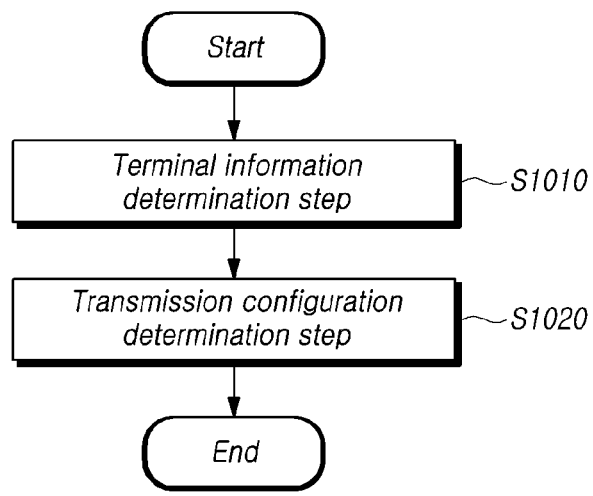
FIG. 10 is a flow chart to show operation of a base station according to one aspect of the present disclosure.

FIG. 10 is a flow chart to show operation of a base station according to one aspect of the present disclosure.

Referring to FIG. 10, a method of the present disclosure includes a terminal information determination step S1010 of determining whether a terminal is a target terminal whose location is required to be measured, and a transmission configuration determination step S1020 of determining a configuration for transmitting control information for the terminal based on a result of the determination.

Specifically, the base station of the present disclosure can determine whether a terminal is a target terminal whose location is required to be measured or a normal terminal whose location is not required to be measured, at step S1010.

In one embodiment, the base station can determine whether a terminal is a target terminal whose location is required to be measured, or a normal terminal whose location is not required to be measured based on a request signal received from one or more signal measurement devices measuring a location of the terminal.

In another embodiment, when a request signal is received from a terminal, the base station can determine that the terminal is a target terminal whose location is required to be measured.

In another embodiment, the base station can determine whether a terminal is a target terminal whose location is required to be measured, or a normal terminal whose location is not required to be measured based on a request signal received from an external server.

Further, the base station of the present disclosure can determine a configuration for transmitting control information for the terminal based on a result of the determination of the terminal information determination step, at step S1020. When the terminal is the terminal whose location is required to be measured, the base station can determine the configuration for transmitting control information for the terminal considering a state of a signal measurement device measuring a location of the terminal, such as a location, a channel state, and the like, as well as a state of the terminal. In the other hand, when the terminal is a normal terminal whose location is not required to be measured, the base station can determine to transmit control information for the terminal considering only a state of the terminal.

Specifically, when the terminal is determined as the target terminal, the base station can determine at least one of a control channel element (CCE) aggregation level for transmitting control information for the terminal, a modulation and coding scheme (MCS), the amount of resources, the number of bits of transmission data, the minimum number of times that HARQ transmission is required to be performed, transmission power, and a scrambling configuration for a PDCCH.

In one embodiment, when the terminal is determined as the target terminal, the base station can determine a CCE aggregation level based on a CCE aggregation level considering a minimum CCE aggregation level and a channel state of the terminal.

In another embodiment, when it is determined that the terminal is the target terminal, the base station can determine to transmit control information for the terminal using transmission power greater than first transmission power. Here, the first transmission power indicates an amount of transmission power that the signal can reach a location of the terminal, and the transmission of control information for the terminal by the base station using transmission power greater than the first transmission power denotes that the control information is transmitted using an amount of power enabling an information collection device, such as a signal measurement device, located farther than the terminal to receive a signal. For example, the base station can transmit a signal using maximum transmission power capable of enabling a signal to reach a farthest location of the coverage of the base station.

In another embodiment, when it is determined that the terminal is the target terminal, the base station can configure scrambling for the PDCCH not to use identifier information of the terminal.

Further, an nID may be configured to be equal to, or in the same manner as, information of a cell ID. The base station can provide this configuration to the signal measurement device of the present disclosure.

In another embodiment, when it is determined that the terminal is the target terminal, the base station can determine to transmit a higher layer parameter used for scrambling for the PDCCH and identifier information of the terminal to the signal measurement device. That is, the base station performs scrambling using a function of using RNTI information and using nID information, and provides related information to the device of the present disclosure in advance. Alternatively, this information may be defined in advance between the base station and the signal measurement device of the present disclosure. The signal measurement device according to embodiments of the present disclosure performs a reception for the PDCCH based on scrambling information on the PDCCH.

In LTE system, uplink resource assignment information may be transmitted over the PDSCH, as well as the PDCCH. In this case, downlink resource assignment information may be transmitted over the PDCCH, and thereafter, uplink resource assignment information and information on a transmission period, and the like may be transmitted over the PDSCH. Generally, the control for uplink transmission performed through the PDSCH may be, for example, a configuration for the PUCCH, periodic signal transmission through the uplink, semi-persistent scheduling.

When the base station transmits uplink resource assignment for a target terminal over the PDSCH, since the signal measurement device of the present disclosure cannot identify the resource assignment, for example, which type of the resource assignment is transmitted, there is a problem that the signal measurement device is required to attempt to receive all PDSCHs transmitted to the target terminal. This may cause the complexity of the signal measurement device of the present disclosure to increase. In the present disclosure, when a base station transmits a PDSCH for uplink resource assignment to a target terminal, a data transmission scheme, such as an available modulation and coding scheme (MCS), the amount of resources, the number of bits of transmission information, a transmission scheme, and the like may be defined in advance. For example, the PDSCH may be transmitted using an IMCS, which is an MCS index, less than or equal to a predetermined IMCS. In one embodiment, the MCS index for transmitting the PDSCH may be limited to between 1 and 5. In another embodiment, the MCS index for transmitting the PDSCH may be limited to only 0 or 1. In further another embodiment, the MCS index for transmitting the PDSCH may be limited to only 0. Further, when one block is transmitted, the number of bits of control information related to uplink resource assignment allowed to be transmitted may be limited within a predetermined number of bits. Further, when control information is transmitted, the control information may be defined to be transmitted in only a transmission antenna diversity mode.

In the present disclosure, in order to improve a probability that a signal measurement device successfully receives PDSCH information transmitted to a target terminal, even when the target terminal successfully has decoded this, the base station can additionally perform the HARQ. That is, the minimum number of times that HARQ transmission is required to be performed may be defined in advance, and even when the target terminal transmits an ACK, the base station may continually perform the HARQ operation until the minimum number of times is reached.

In one embodiment, the method of present disclosure may further include a communication step of communicating with one or more signal measurement devices measuring a location of a terminal. The base station can receive channel state information of the signal measurement device from the signal measurement device, and determine a configuration for transmitting control information for the terminal based on a result determined in the terminal information determination step and the channel state information of the signal measurement device. Specifically, the signal measurement device of the present disclosure can periodically, or aperiodically, provide a state of a forward channel to a mobile communication system or a base station. Further, based on this, the base station may change information on transmission schemes of the control channel and the data channel, and additionally provide this to the signal measurement device of the present disclosure. In this manner, information on a scheme for transmitting control information to a target terminal may be changed depending on a channel state of the signal measurement device.

In one embodiment, the method of the present disclosure may further include a communication step of communicating with the signal measurement device measuring a location of a terminal. Specifically, the base station may transmit, to a signal measurement device, at least one of a CCE aggregation level, an MCS, the amount of resources, the number of bites of transmission data, the minimum number of times that HARQ transmission is required to be performed, transmission power, and a scrambling configuration for a PDCCH.

Further, in a communication system including one or more base stations, one or more target terminals whose locations are required to be measured and whose presence or absence is required to be determined, one or more signal measurement devices detecting a signal transmitted by the target terminal according to embodiments of the present disclosure, the signal measurement device can define information on a transmission format for transmitting control information to the target terminal in advance with the base station, and thereafter, considering the predefined transmission format, receive control information transmitted to the target terminal on downlink. That is, the base station can share at least one of a CCE aggregation level, an MCS, the amount of resources, the number of bites of transmission data, the minimum number of times that HARQ transmission is required to be performed, transmission power, and a scrambling configuration for a PDCCH in advance with the signal measurement device.

When the method of the present disclosure is used, reduce the complexity of the signal measurement device receiving control information can be reduced and a performance of the signal measurement device for receiving the control information transmitted to a target terminal can be improved.

In the present disclosure, a signal measurement device in the vicinity of a target terminal can detect an uplink signal transmitted by the target terminal, and measure the detected uplink signal. In order for the signal measurement device of the present disclosure to detect the uplink signal transmitted by the target terminal in the farther distance, or measure it accurately, it is necessary for a base station to configure a transmission format, an MCS, and transmission power of uplink transmitted to the target terminal to be different from those for a normal terminal.

In one embodiment, by configuring an MCS or a bandwidth of an uplink signal transmitted by a target terminal to be different from that of a normal terminal, the signal measurement device of the present disclosure can thus detect the uplink signal from the target terminal more efficiently. Further, HARQ transmission for the target terminal may be operated to be different from that for a normal terminal.

When uplink resource assignment is needed to do this, the base station may determine whether a terminal for which the resource assignment is required is a normal terminal or a target terminal. If the resource assignment is for a normal terminal, the base station can perform the resource assignment using transmission types, such as an MCS, transmission power, a bandwidth, and the like, and corresponding parameters, which can satisfy the QoS of the terminal. However, on the other hand, if the resource assignment is for a target terminal, the base station can perform the resource assignment so that the signal measurement device of the present disclosure can detect a corresponding uplink signal more efficiently.

When the base station of present disclosure performs resource assignment for a target terminal, the base station can assign a bandwidth broader than a bandwidth needed for a data transmission of a normal terminal to a PUSCH which is an uplink channel. In this case, the base station can assign a bandwidth greater than or equal to a minimum bandwidth defined in advance to the uplink channel, and transmit corresponding information. In this case, the assignment of the bandwidth for the target terminal may be performed only in a period of time defined in advance, and a bandwidth assigned for a normal terminal may be assigned for the remaining period of time.

In another method, an uplink channel transmitted by a target terminal may be configured with an MCS different from that assigned for a normal terminal. For example, an MCS of a PUSCH transmitted by a target terminal may be configured as a level lower than or equal to a predetermined level, and thus, an uplink signal transmission may be performed using the low MCS. In one embodiment, the PUSCH may be transmitted using a lowest MCS.

In another method, the HARQ of the PUSCH for a target terminal may be implemented differently from that implemented for a normal terminal. In case of the HAQR of a normal terminal, when a base station successfully receives data, the base station does not request the transmit of an uplink signal for the same data any more, but in the present disclosure, even when the base station successfully receives data, the base station can additionally request the transmit of an uplink signal for the same data. This is for the purpose of enabling the signal measurement device of the present disclosure to easily detect and measure signals from a target terminal by enabling the target terminal to repeatedly transmit uplink signals in a similar pattern. For example, a target terminal may be requested to perform HAQR transmission greater than or equal to N1 times in a specific time period, or in a specific pattern, for a target terminal. Here, N1 is a value defined in advance between the base station and the signal measurement device. In one embodiment, HARQ transmission may be configured to be performed a maximum number of times that HARQ transmission can be performed.

Further, according to embodiments of the present disclosure, a base station can configure transmission power performed by a target terminal to have a level higher than transmission power performed by a normal terminal so that a signal measurement device can detect an uplink signal from a target terminal in the farther distance and measure it accurately. The base station can determine whether a terminal required to receive resource assignment is a normal terminal or a target terminal, and based on the determination, configure power transmitted by the target terminal to be different from power transmitted by the normal terminal. In one embodiment, uplink power transmitted by a target terminal may be configured to be greater than uplink power transmitted by a normal terminal. As a result of this configuration, an uplink signal from the target terminal with a greater level than an uplink signal from a normal terminal may be received by a receiver of the base station (based on power received in a same bandwidth in a same time period). Further, an uplink signal transmitted by a target terminal may be also configured to be transmitted with greater power than one or more other time periods in a time period defined in advance.

In the LTE system, when a terminal transmits an uplink signal, transmission power may be determined by various parameters. In one embodiment, a base station can set a parameter related to transmission power of a target terminal to be different from a parameter set to a normal terminal. The transmission power of the target terminal may be set to be greater than the transmission power of the normal terminal.

In the case of the LTE system, a PUCCH, a PUSCH, an SRS, and the like may be configured as an uplink channel for enabling a target terminal to transmit a signal. The uplink transmission power of the terminal can be controlled by using different parameters for each channel.

In the case of the PUCCH, PO_PUCCH may be configured to be different for each terminal. That is, this means that PO_PUE_PUCCH is configured differently for each terminal. In another method, a modification value may be set through power control so that each terminal can have different δPUCCHs. In another example, a power control command may be transmitted so that a g(i) value can have different values for each terminal.

In the case of the PUSCH, PO_PUsCH may be configured to be different for each terminal. That is, this means that PO_PUE_PUSCH is configured differently for each terminal. This value may be set to have a different value according to whether a transmitted PUSCH is based on semi-persistent scheduling, dynamic assignment, or a grant of random access. When setting all or at least a part of the values described above, a target terminal may be set to have a value different from a normal terminal. Further, when setting one or more of these values, a target terminal may be set to have a value greater than a normal terminal. In another method, a modification value may be set through power control so that each terminal can have different δPUSCHs. This enables f(i) in transmission power to have a different value.

If after an SRS is transmitted, it is desired to detect an uplink signal of a target terminal based on this, power control may be performed through a configuration of PSRS_OFFSET or PO_PUSCH. That is, when setting one or more of the values described above, a target terminal may be set to have a value different from a normal terminal. In one embodiment, one or more of these values set to a target terminal may have a value greater than one or more of the values set to a normal terminal. In another example, a power control command may be transmitted so that f(i) in transmission power to have a different value.

In the present disclosure, discussions have been conducted on the embodiments of methods in which a base station configures a target terminal to transmit a signal with power higher than a normal terminal. However, the transmission of the signal with the high power may include that not only is the signal continually transmitted with the high power, but a parameter and power control command is set so that transmission power of a target terminal can have a value higher than transmission power of a normal terminal in a specific period. That the transmission power is high may include that not only is power actually transmitted high, but a signal is transmitted with higher power when the signal is transmitted using an identical channel, an identical MCS, and the like.

When the signal measurement device of the present disclosure identifies a location of a target terminal, various methods may be used. For example, a time delay of radio-propagation based on an arrival time at which a signal is received may be used. Further, a distance can be measured based on the propagation attenuation of a signal. In another method, a direction in which a signal is received may be used.

Propagation attenuation of an uplink signal may be used when a signal measurement device determines a location of a target terminal. In this case, if the signal measurement device knows in advance transmission power with which the uplink signal is transmitted by the target terminal, the signal measurement device can measure a location of the target more accurately.

To do this, the base station of the present disclosure can calculate transmission power of an uplink signal transmitted by the target terminal, and transmit measurement results to a signal measurement server. The base station can calculate power transmitted by the target terminal using various methods. For example, the target terminal can transmit a power headroom report periodicity or aperiodically for calculating of the transmission power from the target terminal. The base station can calculate transmission power of a signal transmitted by the target terminal based on this information. This information may be transmitted to the location measurement server. Further, this information may be transmitted to a signal measurement device of the present disclosure.

When the base station transmits the information on the transmission power of the target terminal to the location measurement server, the location measurement server can measure propagation attenuation between the target terminal and the signal measurement device based on the transmission power of the target terminal. In this case, the location measurement server can receive the transmission power information of the target terminal from the base station, and calculate corresponding propagation attenuation by receiving reception power information of the target terminal from one or more signal measurement devices. Propagation attenuation between the target terminal and a j-th signal measurement device may be calculated based on the following equation.

$$\text{Propagation attenuation }(j)=\text{reception power of a signal from a target terminal }(j)-\text{transmission power of the target terminal.} \quad [\text{Equation 1}]$$

Here, j is an index of signal measurement devices.

In another method, the base station can transmit the transmission power information of the target terminal to each signal measurement device. This may be implemented such that the base station transmits the information to the location measurement server, and then the location measurement server transmits this to the signal measurement devices. In this case, each signal measurement device can calculate propagation attenuation between the target terminal and the signal measurement device based on the transmission power information of the target terminal received from the base station and reception power information of the target terminal measured by the signal measurement device itself. Propagation attenuation (j) between the target terminal and the j-th signal measurement device may be calculated based on the Equation 1.

In the above process, although the embodiments in which a base station transmits transmission power information of a target terminal have been discussed, it should be noted that these embodiment can be implemented in a manner that one or more parameters related to transmission power including a power headroom report of the target terminal are transmitted to a location measurement server or one or more signal measurement devices of the present disclosure, and the location measurement server or the signal measurement device calculates the transmission power of the target terminal.

Figure 11:
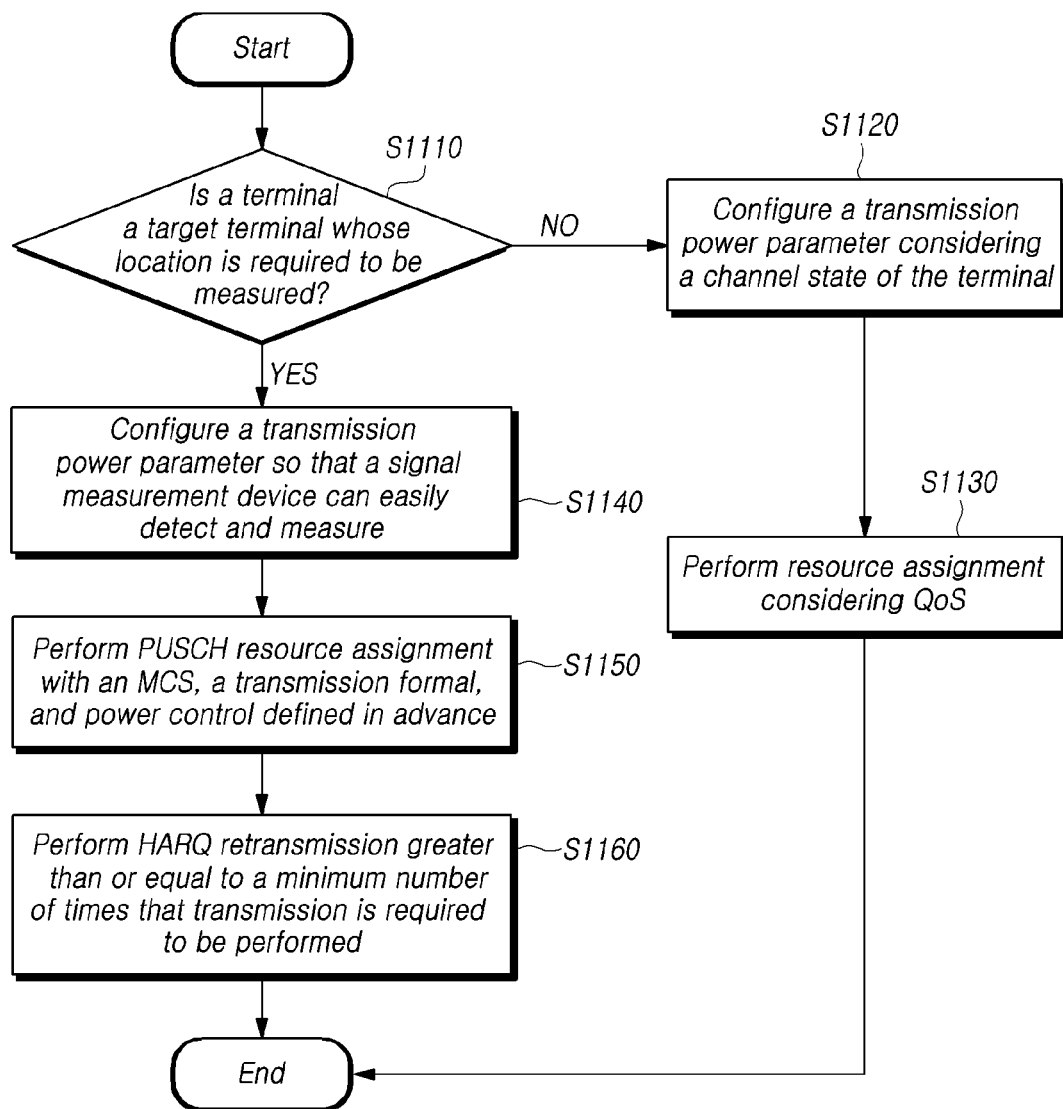
FIG. 11 is a flow chart to show a method for uplink resource assignment and power control of a base station according to one aspect of the present disclosure.

FIG. 11 is a flow chart to show a method of uplink resource assignment and power control of a base station according to one aspect of the present disclosure. Referring to FIG. 11, the base station can determine whether a terminal to which uplink resource assignment is performed is a target terminal or a normal terminal, at step S1110. When the terminal is not the target terminal whose location is required to be measures, a parameter considering a channel state of the terminal can be set, at step S1120. That is, when resource assignment is for a normal terminal, QoS-based normal resource assignment and HARQ operation may be performed. Further, a parameter related to uplink transmission power may be set such that the uplink power is transmitted with a setting for the normal terminal. Such a transmission power parameter may be persistently used in a predetermined period or longer in a state where it is preset rather than being performed per resource assignment. Further, when resource assignment for an uplink channel is performed, in the case of the normal terminal, the resource assignment can be performed considering Quality of Service (QoS) of the channel transmitted by the terminal, at step S1130. On the other hand, when the terminal is the target terminal whose location is required to be measured, a transmission power parameter can be set so that the signal measurement device of the present disclosure can easily detect and measure in the farther distance, at step S1140. Further, corresponding resource assignment can be performed so that the signal measurement device can easily detect and measure, at step S1150. As an example of the resource assignment for the target terminal, a predetermined bandwidth or more may be assigned, or the resource assignment may be performed to transmit using a predefined MCS or less. In order to improve a reception probability of the signal measurement device, the base station can perform HARQ retransmission greater than or equal to a minimum number of times that transmission is required to be performed, at step S1160. Further, the resource assignment for the target terminal may be performed only in one or more time periods rather than being applied to all TTIs. Further, information on the one or more time periods may be shared between the base station and the signal measurement device of the present disclosure, and thus, corresponding operation may be performed based on the shared information.

Figure 12:
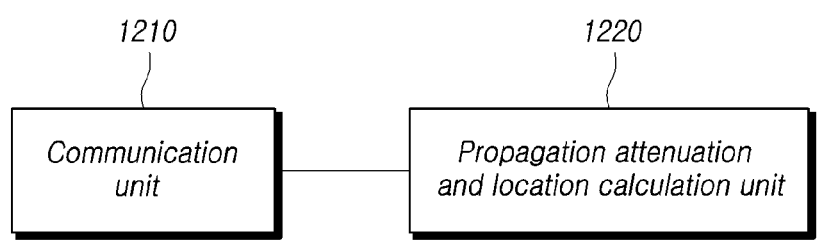
FIG. 12 is a block diagram illustrating a configuration of a location measurement server according to one aspect of the present disclosure.

FIG. 12 is a block diagram illustrating operation of a location measurement server according to one aspect of the present disclosure. Referring to FIG. 12, the location measurement server includes a communication unit 1210, and a propagation attenuation and location calculation unit 1220. Specifically, the communication unit 1210 can receive a parameter related to a transmission power configuration of a target terminal from a base station of a mobile communication network. This parameter may include information related to the transmission power of the terminal calculated by the base station through a power headroom report from the target terminal. Further, the communication unit 1210 of the location measurement server can receive information on power received from the target terminal from a signal measurement device of the present disclosure. The propagation attenuation and location calculation unit 1220 of the location measurement server can calculate propagation attenuation between the target terminal and each signal measurement device based on the information. Further, the propagation attenuation and location calculation unit 1220 can calculate a location of the target terminal using the information on the propagation attenuation.

The terms "system", "processor", "controller", "component", "module", "interface", "model", "unit", and the like, may generally refer to computer-related entity hardware, a combination of hardware and software, software, or software in execution. For example, such elements described above may be, but not limited to, a process driven by the processor, a control processor, an entity, a running thread, a program and/or a computer. For example, when an application runs on a controller or a processor, all of the application, the controller or the processor can become one element. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2018-0088512, filed on Jul. 30, 2018, Patent Application No. 10-2019-0091905, filed on Jul. 29, 2019 in Korea, the entire contents of which are incorporated herein by reference. In addition, this non-provisional application claims priorities in countries other than the U.S. for the same reason based on the Korean Patent Applications, the entire contents of which are hereby incorporated by reference.

What is claimed is:

1. A base station comprising:
    a terminal information determination unit determining whether a terminal is a target terminal that is a target for location tracking;
    a transmission configuration determination unit determining a configuration for transmitting control information for the terminal based on a result of the determination; and
    a communication unit transmitting the control information for the terminal in a downlink,
    wherein the transmission configuration determination unit, when the terminal is determined to be the target terminal, determines the configuration for transmitting the control information for the terminal so that reception performance of the control information transmitted to the terminal is better than reception performance of control information transmitted to another terminal that is not a target for location tracking.

2. The base station according to claim 1, wherein the terminal information determination unit determines whether the terminal is the target terminal whose location is required to be measured based on a request signal received from a signal measurement device measuring a location of the terminal.

3. The base station according to claim 1, wherein when a request signal is received from the terminal, the terminal information determination unit determines that the terminal is the target terminal whose location is required to be measured.

4. The base station according to claim 1, wherein the terminal information determination unit determines whether the terminal is the target terminal whose location is required to be measured based on a request signal received from an external server.

5. The base station according to claim 1, wherein when it is determined that the terminal is the target terminal, the terminal information determination unit determines at least one of a control channel element (CCE) aggregation level for transmitting control information for the terminal, a modulation and coding scheme (MCS), an amount of resources, a number of bits of transmission data, a minimum number of times that hybrid automatic repeat request (HARQ) transmission is required to be performed, transmission power, and a scrambling configuration for a physical downlink control channel (PDCCH).

6. The base station according to claim 5, wherein when it is determined that the terminal is the target terminal, the terminal information determination unit determines the CCE aggregation level based on a CCE aggregation level considering a minimum CCE aggregation level and a channel state of the terminal.

7. The base station according to claim 5, wherein when it is determined that the terminal is the target terminal, the terminal information determination unit determines to transmit control information for the terminal with transmission power higher than first transmission power.

8. The base station according to claim 5, wherein when it is determined that the terminal is the target terminal, the terminal information determination unit determines to configure the scrambling for the PDCCH not to use identifier information of the terminal.

9. The base station according to claim 5, wherein when it is determined that the terminal is the target terminal, the terminal information determination unit determines to transmit a higher layer parameter used for the scrambling for the PDCCH and identifier information of the terminal to a signal measurement device.

10. The base station according to claim 5, wherein the communication unit transmits, to a signal measurement device, at least one of the CCE aggregation level, the MCS, the amount of resources, the number of bits of transmission data, the minimum number of times that HARQ transmission is required to be performed, the transmission power, and the scrambling configuration for the PDCCH.

11. The base station according to claim 5, wherein the CCE aggregation level, the MCS, the amount of resources, the number of bits of transmission data, the minimum number of times that HARQ transmission is required to be performed, the transmission power, and the scrambling configuration for the PDCCH are information having been shared with a signal measurement device in advance.

12. The base station according to claim 1, wherein the communication unit receives channel state information of a signal measurement device from the signal measurement device,
wherein the transmission configuration determination unit determines a configuration for transmitting control information for the terminal based on the result of the determination and the channel state information of the signal measurement device.

13. A method comprising:
determining whether a terminal is a target terminal that is a target for location tracking;
determining a configuration for transmitting control information for the terminal based on a result of the determination; and
transmitting the control information for the terminal in a downlink, wherein the determining the configuration comprises, when the terminal is determined to be the target terminal, determining the configuration for transmitting the control information for the terminal so that reception performance of the control information transmitted to the terminal is better than reception performance of control information transmitted to another terminal that is not a target for location tracking.

14. The method according to claim 13, wherein the determining whether a terminal is a target terminal comprises determining whether the terminal is the target terminal whose location is required to be measured based on a request signal received from a signal measurement device measuring a location of the terminal.

15. The method according to claim 13, wherein the determining whether a terminal is a target terminal comprises, when the request signal is received from the terminal, determining that the terminal is the target terminal whose location is required to be measured.

16. The method according to claim 13, wherein the determining whether a terminal is a target terminal comprises determining whether the terminal is the target terminal whose location is required to be measured based on a request signal received from an external server.

17. The method according to claim 13, wherein the determining whether a terminal is a target terminal comprises, when the terminal is determined to be the target terminal, determining at least one of a control channel element (CCE) aggregation level for transmitting control information for the terminal, a modulation and coding scheme (MCS), an amount of resources, a number of bits of transmission data, a minimum number of times that hybrid automatic repeat request (HARQ) transmission is required to be performed, transmission power, and a scrambling configuration for a physical downlink control channel (PDCCH).

18. The method according to claim 17, wherein the determining whether a terminal is a target terminal comprises, when the terminal is determined to be the target terminal, determining the CCE aggregation level based on a CCE aggregation level considering a minimum CCE aggregation level and a channel state of the terminal.

19. A signal measurement device comprising:
a communication unit transmitting, to a base station, a request signal for requesting control information for a target terminal to perform location measurement for the target terminal;
one or more downlink signal receivers receiving a downlink signal;
a controller acquiring the control information for the target terminal based on the downlink signal, and determining a location of the target terminal based on an uplink signal received from the target terminal; and
one or more uplink signal receivers receiving the uplink signal transmitted from the target terminal to the base station based on the control information for the target terminal.

20. The signal measurement device according to claim 19, wherein the communication unit transmits channel state information of the signal measurement device to the base station.

* * * * *